(12) United States Patent
Arakawa (10) Patent No.: US 6,703,637 B2
(45) Date of Patent: Mar. 9, 2004

(54) RADIATION IMAGE READ-OUT METHOD AND APPARATUS

(75) Inventor: Satoshi Arakawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 187 days.

(21) Appl. No.: 09/969,721

(22) Filed: Oct. 4, 2001

(65) Prior Publication Data

US 2002/0040972 A1 Apr. 11, 2002

(30) Foreign Application Priority Data

Oct. 5, 2000 (JP) ...................................... 2000/305787

(51) Int. Cl.$^7$ ................................................ G01J 1/58
(52) U.S. Cl. ...................................... 250/586; 250/584
(58) Field of Search ................................ 250/586, 584, 250/581, 580, 587, 484.4, 483.1, 336.1

(56) References Cited

U.S. PATENT DOCUMENTS

| | | | |
|---|---|---|---|
| 4,747,052 A | * 5/1988 | Hishinuma et al. | 250/587 |
| 4,816,679 A | 3/1989 | Sunagawa et al. | 250/327.2 |
| 4,922,103 A | 5/1990 | Kawajiri et al. | 250/327.2 |
| 5,028,784 A | 7/1991 | Arakawa et al. | 250/327.2 |
| 5,319,719 A | * 6/1994 | Nakazawa et al. | 382/132 |
| 2002/0024032 A1 | * 2/2002 | Arakawa | 250/588 |
| 2002/0105583 A1 | * 8/2002 | Matsutani et al. | 348/241 |

FOREIGN PATENT DOCUMENTS

| | | | |
|---|---|---|---|
| JP | 60-111568 | 6/1985 | H04N/1/04 |
| JP | 60-236354 | 11/1985 | H04N/1/04 |
| JP | 01101540 | 4/1989 | G03B/42/02 |
| JP | 3-114039 | 5/1991 | G03B/42/02 |

* cited by examiner

*Primary Examiner*—David Porta
*Assistant Examiner*—Christine Sung
(74) *Attorney, Agent, or Firm*—Sughrue Mion, PLLC (57) ABSTRACT

Stimulating rays are linearly irradiated onto an area of a stimulable phosphor sheet, on which a radiation image has been stored by use of a stationary grid. Light emitted by the sheet is detected with a line sensor constituted such that a reciprocal of an array pitch of photoelectric conversion devices is larger than a value two times as large as a spatial frequency of stripe-like grid patterns recorded due to the stationary grid, which spatial frequency is taken with respect to an array direction of the photoelectric conversion devices. Filtering processing for removing the grid patterns is performed on an image signal having been outputted from the line sensor.

6 Claims, 4 Drawing Sheets

RADIATION IMAGE READ-OUT METHOD AND APPARATUS

BACKGROUND OF THE INVENTION

1. Field of the Invention

This invention relates to a radiation image read-out method and apparatus, wherein stimulating rays are irradiated to a stimulable phosphor sheet, on which a radiation image has been stored. Light, which is emitted by the stimulable phosphor sheet when: the stimulable phosphor sheet is exposed to the stimulating rays, is photoelectrically detected, and an image signal representing the radiation image is thereby obtained. This invention particularly relates to a radiation image read-out method and apparatus, wherein a radiation image is capable of being read out from a stimulable phosphor sheet, on which the radiation image has been stored with an image recording operation utilizing a stationary grid, such that adverse effects of grid patterns are eliminated

2. Description of the Related Art

Radiation image recording and reproducing systems utilizing a stimulable phosphor sheet, which comprises a substrate and a layer of a stimulable phosphor overlaid on the substrate, have heretofore been widely used in practice.

With the radiation image recording and reproducing systems, a stimulable phosphor sheet is exposed to radiation carrying image information of an object, such as a human body, and a radiation image of the object is thereby recorded on the stimulable phosphor sheet. Thereafter, stimulating rays, such as a laser beam, are caused to scan the stimulable phosphor sheet in two-dimensional directions. The stimulating rays cause an exposed area of the stimulable phosphor sheet to emit light in proportion to the amount of energy stored thereon during its exposure to the radiation. The light emitted from the exposed area of the stimulable phosphor sheet, upon stimulation thereof, is photoelectrically detected and converted into an electric image signal by photoelectric read-out means.

The image signal, which has been, obtained from the radiation image recording and reproducing systems described above, is then subjected to image processing, such as gradation processing and processing in the frequency domain, such that a visible radiation image can be obtained. In particular, the image has good image quality and can serve as an effective tool in the efficient and accurate diagnosis of an illness, for example. The image signal having been obtained from the image processing is utilized for reproducing a visible image for diagnosis, or the like, on film or displaying a visible image for diagnosis, or the like, on a cathode ray tube (CRT) display device. In cases where the stimulable phosphor sheet, from which the image signal has been detected, is then exposed to erasing light, and energy remaining on the stimulable phosphor sheet is thereby released, the erased stimulable phosphor sheet is capable of being used again for the recording of a radiation image.

Also, a radiation image recording and reproducing system aiming at enhancement of a detection quantum efficiency in the formation of the radiation image, i.e., a radiation absorptivity, a light emission efficiency, an emitted light pickup efficiency, and the like, wherein a certain type of stimulable phosphor sheet is utilized, has been proposed in, for example, Japanese Patent Application No. 11(1999)-372978. With this type of the stimulable phosphor sheet utilized in the proposed radiation image recording and reproducing system, the radiation absorbing functions and the energy storing functions of the conventional stimulable phosphor sheet are separated from each other.

The stimulable phosphor sheet utilized in the proposed radiation image recording and reproducing system contains a layer of a stimulable phosphor for energy storage, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The stimulable phosphor sheet should preferably take on the form combined with a layer of a phosphor for radiation absorption, which is capable of absorbing radiation and being caused to emit light having wavelengths falling within an ultraviolet to visible region. In such cases, energy from the light having wavelengths falling within the ultraviolet to visible region, which light is emitted from the layer of the phosphor for radiation absorption when the layer of the phosphor for radiation absorption is exposed to the radiation carrying image information of an object, (the amount of the energy corresponding to the radiation image information) is stored on the layer of the stimulable phosphor for energy storage. When the stimulable phosphor sheet, on which the radiation image has thus been stored, is scanned with the stimulating rays, the light carrying the radiation image information is emitted from the layer of the stimulable phosphor for energy storage.

The stimulable phosphor sheet need not necessarily be provided with the layer of the phosphor for radiation absorption. In such cases, the stimulable phosphor sheet is utilized in combination with a fluorescent screen, which is provided with the layer of the phosphor for radiation absorption capable of absorbing radiation and being caused to emit the light having wavelengths falling within the ultraviolet to visible region.

Specifically, in such cases, the fluorescent screen is kept in close contact with the novel type of the stimulable phosphor sheet, and the radiation carrying the image information of the object is irradiated to the fluorescent screen. As a result, the light having wavelengths falling within the ultraviolet to visible region is emitted from the layer of the phosphor for radiation absorption of the fluorescent screen. Also, energy from the light emitted from the phosphor for radiation absorption (the amount of the energy corresponding to the radiation image information) is stored on the layer of the stimulable phosphor for energy storage of the stimulable phosphor sheet. When the stimulable phosphor sheet, on which the radiation image has thus been stored, is scanned with the stimulating rays, the light carrying the radiation image information is emitted from the layer of the stimulable phosphor for energy storage.

Radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line sensor comprising a charge coupled device (CCD) image sensor, or the like, is utilized as the photoelectric read-out means.

Basically, the radiation image read-out apparatuses of such types comprise:

i) stimulating ray irradiating means for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor, which comprises a plurality of photoelectric conversion devices arrayed along the linear area of the stimulable phosphor sheet exposed to the linear stimulating rays, and iii) sub-scanning means for moving the stimulable phosphor sheet with respect to the stimulating ray irradiating means and the line sensor and in a direction (a sub-scanning direction) intersecting with a length direction of the linear area of the stimulable phosphor sheet exposed to the linear stimulating rays (a main scanning direction).

The stimulating ray irradiating means for linearly irradiating the stimulating rays onto the stimulable phosphor sheet in the manner described above may be constituted so as to produce fan beam-like stimulating rays. Alternatively, the stimulating ray irradiating means may be constituted so as to deflect a thin beam and to cause the deflected thin beam to linearly scan the stimulable phosphor sheet.

When the radiation image of the object is to be recorded on the stimulable phosphor sheet, the operation for recording the radiation image is often performed with a grid being located between the object and the stimulable phosphor sheet, such that the radiation, which has been scattered by the object, does not impinge upon the stimulable phosphor sheet. The grid comprises radiation absorbing members, which do not transmit the radiation and may be constituted of lead, or the like, and radiation transmitting members, which may be constituted of aluminum, wood, or the like. The radiation absorbing members and the radiation transmitting members are arrayed alternately at a fine pitch of, for example, several grid members per mm of length.

In cases where the image recording operation is performed by utilizing the grid described above, the radiation having been scattered by the object is prevented from impinging upon the stimulable phosphor sheet, and therefore contrast of the radiation image of the object is capable of being enhanced. However, in such cases, fine stripe-like grid patterns are recorded on the stimulable phosphor sheet together with the object image.

In order for the grid patterns to be prevented from being recorded on the stimulable phosphor sheet, a radiation image read-out apparatus has been proposed, wherein the radiation image is recorded while a grid is being quickly moved reciprocally. However, the proposed radiation image read-out apparatus has the drawbacks in that, a driving device for moving the grid must be provided, the size of the apparatus cannot be kept small, and the cost of the apparatus cannot be kept low.

Accordingly, a technique has been proposed, wherein a stationary grid is utilized as the grid, a read-out image signal having been obtained by reading out the radiation image is subjected to filtering processing, and the grid patterns having been recorded on the stimulable phosphor sheet together with the object image, are thereby removed or suppressed. An example of the filtering processing described above is disclosed in, for example, Japanese Unexamined Patent Publication No. 3(1991)-114039.

It is considered that the filtering processing described above is also applicable to an image signal, which has been obtained from the radiation image read-out apparatuses utilizing the line sensors, and the desired effects can thereby be obtained. However, actually, the grid patterns cannot always be removed or suppressed appropriately.

SUMMARY OF THE INVENTION

The primary object of the present invention is to provide a radiation image read-out method, wherein a line sensor is utilized, and a radiation image is capable of being read out from a stimulable phosphor sheet, on which the radiation image has been stored with an image recording operation utilizing a stationary grid, such that grid patterns are capable of being removed or suppressed appropriately.

Another object of the present invention is to provide an apparatus for carrying out the radiation image read-out method.

The present invention provides a radiation image read-out method, comprising the steps of:

i) linearly irradiating stimulating rays onto an area of a stimulable phosphor sheet, on which a radiation image has been stored with an image recording operation utilizing a stationary grid, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices, which are arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a sub-scanning direction intersecting with a length direction of the linear area of the stimulable phosphor sheet exposed to the linear stimulating rays, wherein a reciprocal of an array pitch of the photoelectric conversion devices constituting the line sensor is larger than a value two times as large as a value of a spatial frequency of stripe-like grid patterns recorded on the stimulable phosphor sheet due to the stationary grid, which spatial frequency is taken with respect to an array direction of the photoelectric conversion devices, the line sensor is located in an orientation, such that the array direction of the photoelectric conversion devices coincides with an array direction of the stripe-like grid patterns, in which array direction the stripe-like grid patterns stand side by side, and filtering processing for removing the stripe-like grid patterns is performed on an image signal, which has been outputted from the line sensor.

In the radiation image read-out method in accordance with the present invention, transform processing for coarsening a pixel density should preferably be performed on a filtering-processed image signal, which has been obtained from the filtering processing.

Also, in the radiation image read-out method in accordance with the present invention, the line sensor should preferably be a CCD line sensor.

As will be understood from the specification, it should be noted that the term moving a stimulable phosphor sheet with respect to stimulating ray irradiating means and a line sensor as used herein means movement of the stimulable phosphor sheet relative to the stimulating ray irradiating means and the line sensor, and embraces the cases wherein the stimulable phosphor sheet is moved while the stimulating ray irradiating means and the line sensor are kept stationary, the cases wherein the stimulating ray irradiating means and the line sensor are moved while the stimulable phosphor sheet is kept stationary, and the cases wherein both the stimulable phosphor sheet and the stimulating ray irradiating means and the line sensor are moved. In cases where the stimulating ray irradiating means and the line sensor are moved, they should be moved together with each other.

The present invention also provides an apparatus for carrying out the radiation image read-out method in accordance with the present invention. Specifically, the present invention also provides a radiation image read-out apparatus, comprising:

i) stimulating ray irradiating means for linearly irradiating stimulating rays onto an area of a stimulable phosphor sheet, on which a radiation image has been stored with an image recording operation utilizing a stationary grid, the stimulating rays causing the stimulable phosphor sheet to emit light in proportion to an amount of energy stored thereon during its exposure to radiation, ii) a line sensor comprising a plurality of photoelectric conversion devices, which are arrayed along the linear area of the stimulable phosphor sheet exposed to the linear stimulating rays, and iii) sub-scanning means for moving the stimulable phosphor sheet with respect to the stimulating ray irradiating means and the line sensor and in a sub-scanning direction intersecting with a length direction of the linear area of the stimulable phosphor sheet exposed to the linear stimulating rays, wherein a reciprocal of an array pitch of the photoelectric conversion devices constituting the line sensor is larger than a value two times as large as a value of a spatial frequency of stripe-like grid patterns recorded on the stimulable phosphor sheet due to the stationary grid, which spatial frequency is taken with respect to an array direction of the photoelectric conversion devices, the line sensor is located in an orientation, such that the array direction of the photoelectric conversion devices coincides with an array direction of the stripe-like grid patterns, in which array direction the stripe-like grid patterns stand side by side, and the apparatus further comprises filtering means for performing filtering processing for removing the stripe-like grid patterns on an image signal, which has been outputted from the line sensor.

The radiation image read-out apparatus in accordance with the present invention should preferably further comprise means for performing transform processing for coarsening a pixel density on a filtering-processed image signal, which has been outputted from the filtering means.

Also, in the radiation image read-out apparatus in accordance with the present invention, the line sensor should preferably he a CCD line sensor.

The effects of the radiation image read-out method and apparatus in accordance with the present invention will be described hereinbelow.

Heretofore, the problems often occurred in that, in cases where filtering processing is performed on an image signal, which has been obtained from a radiation image readout apparatus utilizing a line sensor, grid patterns cannot be removed or suppressed appropriately. The inventors conducted extensive research and found that the problems described above occur due to the reasons described below.

Specifically, ordinarily, the pixel size required of the radiation image, which is utilized for medical diagnosis, clinical study, or the like, falls within the range of approximately 100 $\mu$m to approximately 200 $\mu$m. Also, ordinarily, even if the pixel size is set to be smaller than the range described above, significant effects on diagnostic performance of the radiation image cannot be obtained. Therefore, in most of the radiation image read-out apparatuses utilizing a line sensor, a line sensor in which the array pitch of the photoelectric conversion devices falls within the range of approximately 100 $\mu$m to approximately 200 $\mu$m has been employed. In such cases, the sampling interval on the stimulable phosphor sheet falls within the range of approximately 100 $\mu$m to approximately 200 $\mu$m (the spatial frequency of sampling falls within the range of approximately 5 cycles/mm to approximately 10 cycles/mm). As derived from the Nyquist's theorem, in cases where the sampling interval falls within the range described above, an image in which the spatial frequency falls within the range of at most 5 cycles/mm to at most 10 cycles/mm is capable of being read out accurately and reproduced.

However, ordinarily, the array pitch of the radiation absorbing members of the stationary grid falls within the range of approximately 3.4 grid members per/mm to approximately 6 grid members per/mm. Also, ordinarily, the stationary grid is located close to the stimulable phosphor sheet. Therefore, the spatial frequency of the stripe-like grid patterns recorded on the stimulable phosphor sheet also falls within the range of approximately 3.4 cycles/mm to 6 cycles/mm. More specifically, in such cases, the spatial frequency of the grid patterns becomes higher than the range of 2.5 to 5 cycles/mm described above, and it often occurs that the grid patterns cannot be read out accurately. In such cases, even if the filtering processing described above is performed, the grid patterns cannot be removed or suppressed appropriately.

With the radiation image read-out method and apparatus in accordance with the present invention, the line sensor is formed, such that the reciprocal of the array pitch of the photoelectric conversion devices constituting the line sensor (i.e., the spatial frequency of the sampling) is larger than the value two times as large as the value of the spatial frequency of stripe-like grid patterns recorded on the stimulable phosphor sheet due to the stationary grid, which spatial frequency is taken with respect to the array direction of the photoelectric conversion devices. Therefore, as derived from the Nyquist's theorem, the grid patterns are capable of being read out accurately. Accordingly, in cases where the filtering processing described above is performed on the image signal, which has been outputted from the line sensor, the grid patterns are capable of being removed or suppressed appropriately.

If the line sensor, in which the reciprocal of the array pitch of the photoelectric conversion devices is comparatively large (i.e., the array pitch of the photoelectric conversion devices is comparatively small), is employed, and the read-out image is divided into pixels in units of the photoelectric conversion device, it may occur that the pixel size in the read-out image becomes markedly smaller than the range of approximately 100 $\mu$m to approximately 200 $\mu$m, which range is required for practical use. The markedly small pixel size in the read-out image is surplus quality and becomes a heavy burden to image processing, image signal management, and the like, which will be performed later. Therefore, with the radiation image read-out method and apparatus in accordance with the present invention, the transform processing for coarsening the pixel density (i.e., for setting the pixel size to be large) may be performed on the filtering-processed image signal, which has been obtained from the filtering processing. In such cases, the problems described above are capable of being eliminated.

DESCRIPTION OF THE PREFERRED EMBODIMENTS

The present invention will hereinbelow be described in further detail with reference to the accompanying drawings.

Figure 1:
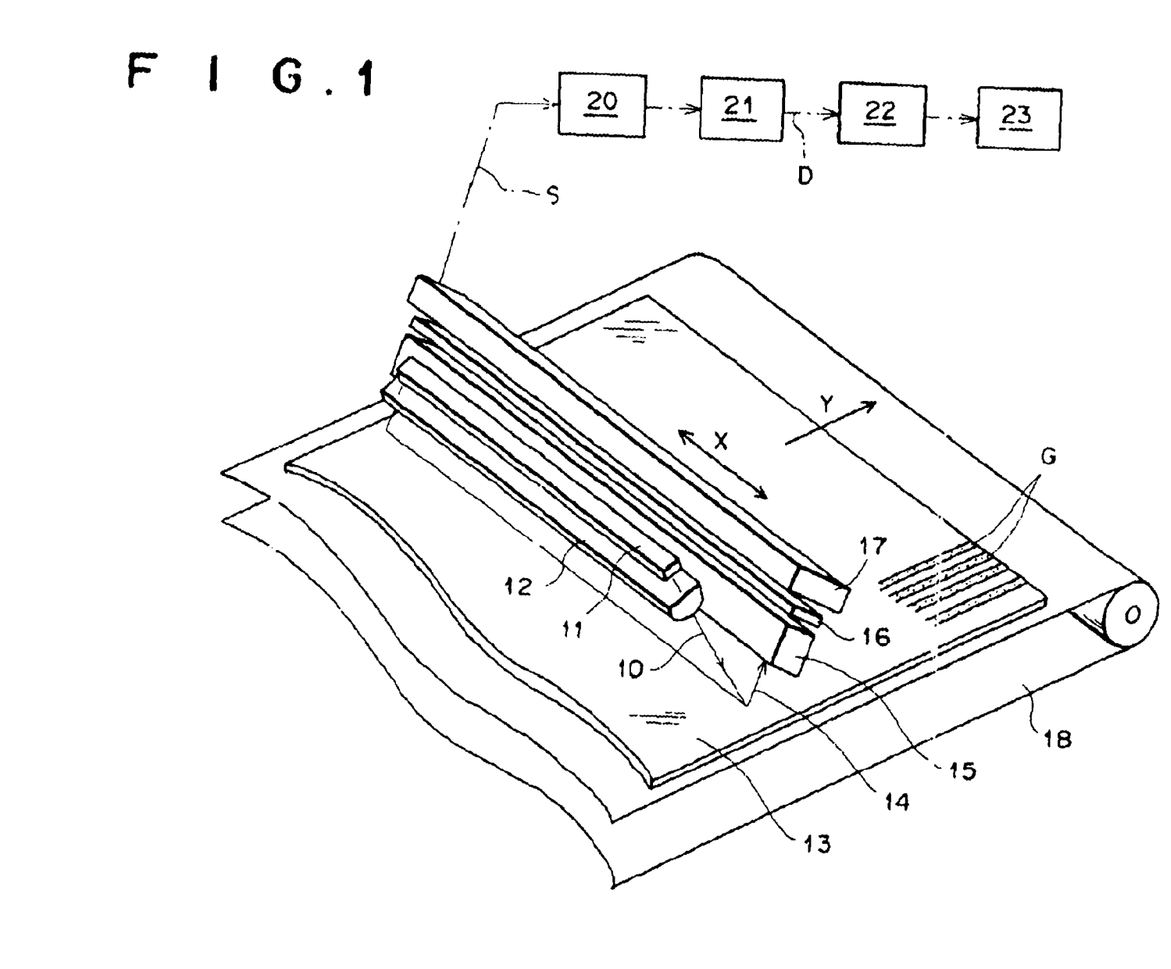
FIG. 1 is a perspective view showing an embodiment of the radiation image read-out apparatus in accordance with the present invention.
Figure 2:
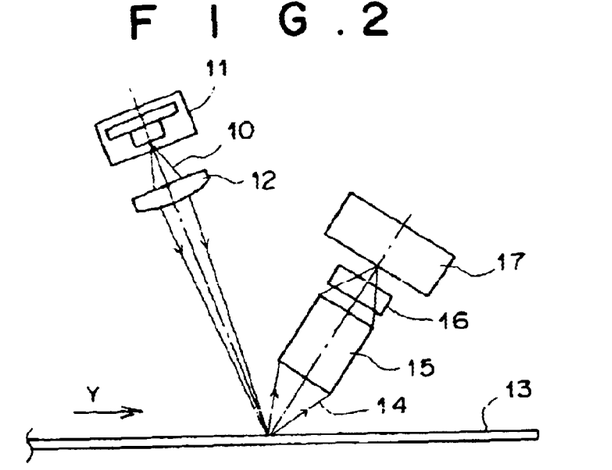
FIG. 2 is a side view showing a read-out optical system employed in the embodiment of FIG. 1.
Figure 3:
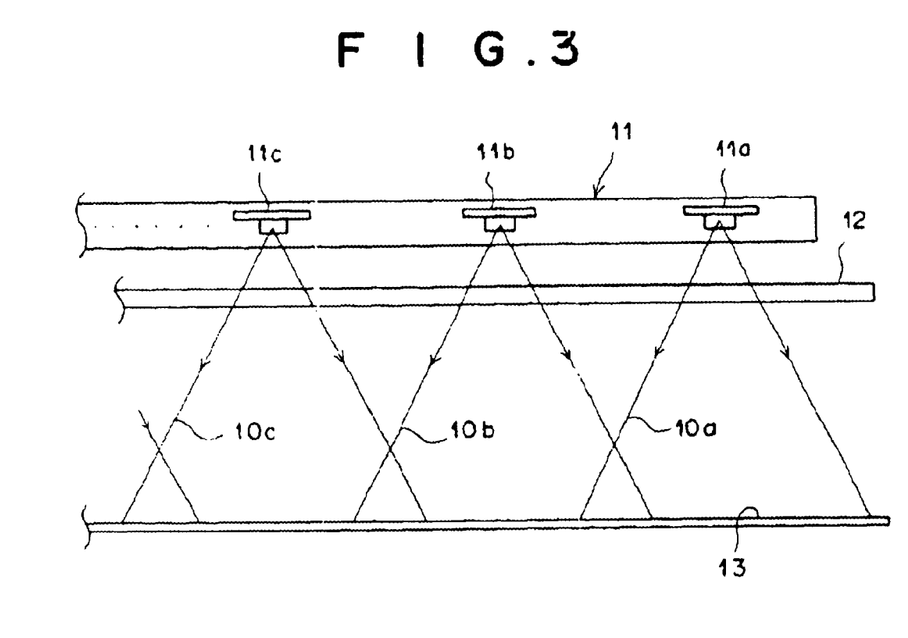
FIG. 3 is a front view showing the read-out optical system of FIG. 2.

FIG. 1 is a perspective view showing an embodiment of the radiation image read-out apparatus in accordance with the present invention. FIG. 2 is a side view showing a read-out optical system employed in the embodiment of FIG. 1. FIG. 3 is a front view showing the read-out optical system of FIG. 2.

As illustrated in FIG. 1, the radiation image read-out apparatus comprises a laser diode array 11, which acts as stimulating ray irradiating means and produces fan beam-like stimulating rays 10. The radiation image read-out apparatus also comprises a cylindrical lens 12 for converging the stimulating rays 10 only in the plane of the sheet of FIG. 2 in order to form linear stimulating rays 10. The radiation image read-out apparatus further comprises a lens array 15 for collecting light 14, which has been emitted from a linear area of a stimulable phosphor sheet 13 exposed to the linear stimulating rays 10. The radiation image read-out apparatus still further comprises a stimulating ray cut-off filter 16, which is located in an optical path of the emitted light 14 having passed through the lens array 15. The radiation image read-out apparatus also comprises a CCD line sensor 17 for detecting the emitted light 14, which has passed through the stimulating ray cut-off filter 16. The radiation image read-out apparatus further comprises an endless belt 18. which acts as sub-scanning means for moving the stimulable phosphor sheet 13 at a predetermined speed and in the direction indicated by the arrow Y, i.e. in the direction normal to the length direction (the direction indicated by the double headed arrow X) of the linear area of the stimulable phosphor sheet 13 exposed to the linear stimulating rays 10.

The radiation image read-out apparatus still further comprises an amplifier 20 for amplifying an analog light detection signal S, which has been fed out from the CCD line sensor 17. The radiation image read-out apparatus also comprises an analog-to-digital converter 21 for digitizing the analog light detection signal S, which has been amplified by the amplifier 20, into a digital image signal D. The digital image signal D, which has been obtained from the analog-to-digital converter 21, is fed into an image processing unit 22, which performs image processing on the digital image signal D. The digital image signal D, which has been obtained from the image processing performed by the image processing unit 22, is fed into an image reproducing apparatus 23.

As illustrated in FIG. 3, the laser diode array 11 comprises a plurality of laser diodes 11a, 11b, 11c, . . . arrayed in a line. By way of example, each of the laser diodes 11a, 11b, 11c, . . . produces a laser beam (the stimulating rays) having a wavelength falling within the range of 650 $\mu$m to 690 $\mu$m. The laser diodes 11a, 11b, 11c, . . . respectively produce stimulating rays 10a, 10b, 10c, . . . in a divergent light state. The stimulating rays 110a, 10b, 10c, which have been produced by the laser diodes 11a, 11b, 11c, . . . are converged by the cylindrical lens 12 with respect to only one direction and into fan beams. The stimulating rays 10, which are composed of the fan beams standing in a row, are linearly irradiated onto the linear area of the stimulable phosphor sheet 13.

Figure 4:
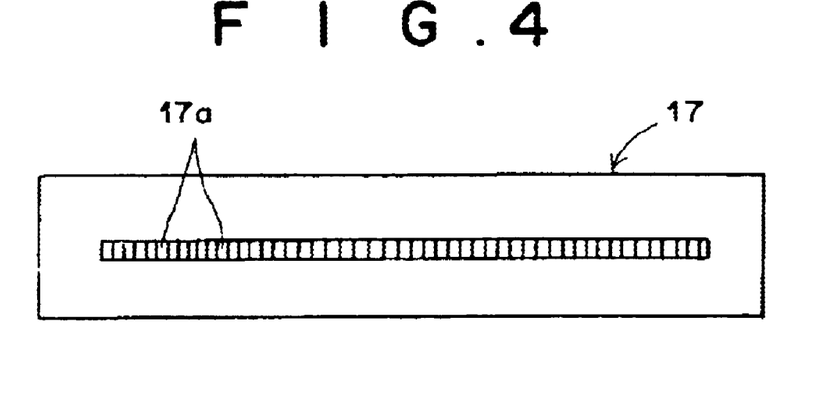
FIG. 4 is a plan view showing a line sensor employed in the embodiment of FIG. 1.

FIG. 4 is a plan view showing the CCD line sensor 17 employed in the embodiment of FIG. 1. As illustrated in FIG. 4, the CCD line sensor 17 comprises a plurality of sensor chips (photoelectric conversion devices) 17a, 17a, . . . , which are arrayed in a line. In this embodiment, the array pitch of the sensor chips 17a, 17a, . . . is equal to 25 $\mu$m. The CCD line sensor 17 is located in an orientation such that the sensor chips 17a, 17a, . . . stand side by side along the length direction of the linear area of the stimulable phosphor sheet 13 exposed to the linear stimulating rays 10, i.e. along the direction indicated by the double headed arrow X in FIG. 1. In cases where the stimulable phosphor sheet 13 has a large width, the CCD line sensor 17 may be composed of a plurality of line sensors, which are arrayed so as to stand in a row along the length direction of the CCD line sensor 17.

Figure 5:
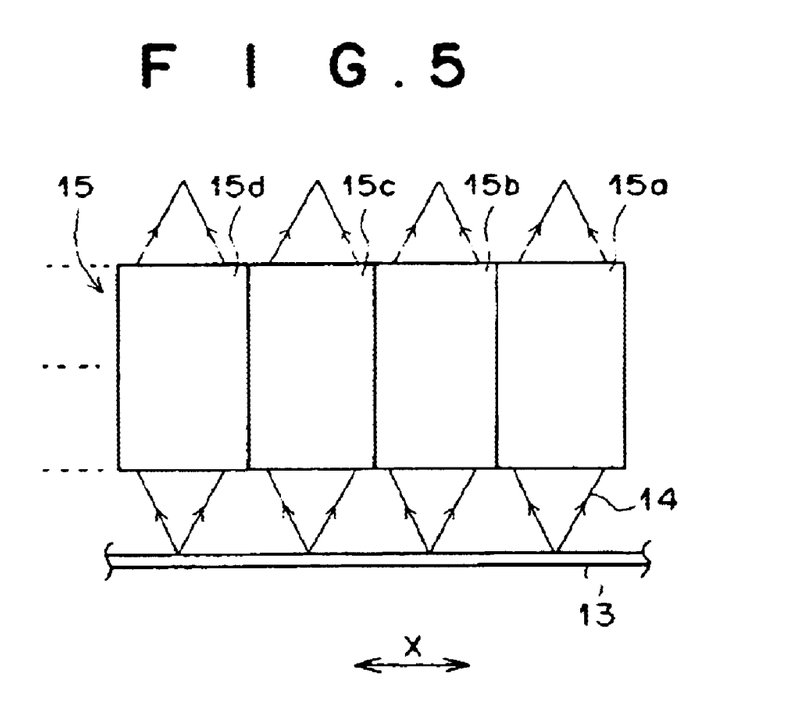
FIG. 5 is a front view showing a lens array employed in the,embodiment of FIG. 1.

FIG. 5 is a front view showing the lens array 15 employed in the embodiment of FIG. 1. As illustrated in FIG. 5, the lens array 15 comprises, for example, a plurality of distributed index lenses 15a, 15b, 15c, 15d, . . . , which are arrayed in a line. The distributed index lenses 15a, 15b, 15c, 15d, . . . constitute an erect equi-magnification optical system. Each of the distributed index lenses 15a, 15b, 15c, 15d, . . . collects the emitted light 14 having been emitted by the stimulable phosphor sheet, 13. Also, as illustrated in FIG. 1, each of the distributed index lenses 15a, 15b, 15c, 15d, . . . guides the emitted light 14 toward the CCD line sensor 17. The lens array 15 is located in an orientation such that the distributed index lenses 15a, 15b, 15c, 15d, . . . stand hide by side along the length direction of the linear area of the stimulable phosphor sheet 13 exposed to the linear stimulating rays 10, i.e. along the direction indicated by the double headed arrow X in FIG. 1.

How the embodiment of the radiation image read-out apparatus in accordance with the present invention operates will be described hereinbelow. In this embodiment, a radiation image has been stored on the stimulable phosphor sheet 13, which is subjected to an image read-out operation performed by the radiation image read-out apparatus, with an image recording operation utilizing a stationary grid. Firstly, how the image recording operation is performed will be described hereinbelow with reference to FIG. 6.

Figure 6:
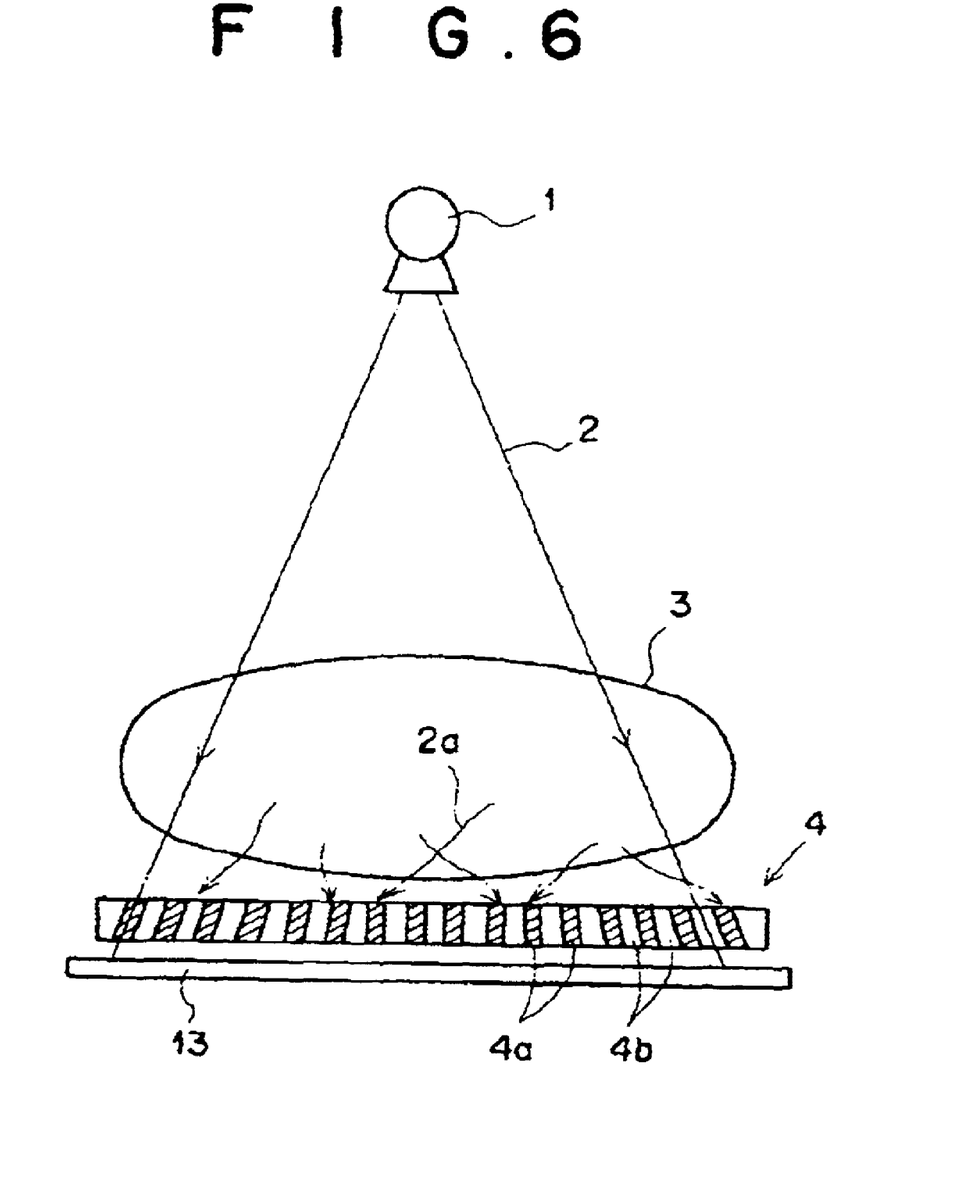
FIG. 6 is a schematic view showing how a radiation image recording operation utilizing a stationary grid is performed.

With reference to FIG. 6, radiation 2 is produced by a radiation source 1, which may be constituted of an X-ray tube, or the like. The radiation 2, which has been produced by the radiation source 1, is irradiated to an object 3. The radiation 2 carrying the image information of the object 3 passes through a stationary grid 4 and impinges upon the stimulable phosphor sheet 13. The stationary grid 4 comprises lead members 4a, 4a, . . . and aluminum members 4b, 4b, . . . , which are arrayed alternately at a pitch of, for example, 4 grid members/mm. The-stationary grid 4 is located close to the stimulable phosphor sheet 13. The lead members 4a, 4a, . . . absorb the radiation 2. The radiation 2 passes through the aluminum members 4b, 4b, . . . and impinges upon the stimulable phosphor sheet 13.

Scattered radiation 2a occurs when the radiation 2 is scattered in the object 3. The scattered radiation 2a impinges obliquely upon the stationary grid 4. Therefore, the scattered radiation 2a is blocked by the stationary grid 4 or is reflected from the stationary grid 4. Specifically, basically, the scattered radiation 2a does not impinge upon the stimulable phosphor sheet 13. Therefore, a clear radiation image free from adverse effects, of the scattered radiation 2a is recorded on the stimulable phosphor sheet 13. However, in such cases, stripe-like grid patterns having a spatial frequency of approximately 4 cycles/mm is recorded on the stimulable phosphor sheet 13 together with the object image.

As illustrated in FIG. 1, the stimulable phosphor sheet 13, on which the radiation image of the object 3 has been stored in the manner described above, is located in the radiation image read-out apparatus, such that the array direction of the stripe-like grid patterns, which are indicated by G, G, . . . in FIG. 1, coincides with the array direction of the sensor chips 17a, 17a, . . . of the CCD line sensor 17. The stimulable phosphor sheet 13, on which the radiation image has been stored, is moved by the endless belt 18 at a predetermined speed and in the direction indicated by the arrow Y. Also, the stimulating rays 10 are produced by the laser diode array 11. The stimulating rays 10, which have been produced by the laser diode array 11, are linearly irradiated to an area of the stimulable phosphor sheet 13.

When the stimulating rays 10 are linearly irradiated to the area of the stimulable phosphor sheet 13, the linear area of the stimulable phosphor sheet 13 exposed to the linear stimulating rays 10 emits the light 14 having intensity in accordance with the radiation image having been stored on the stimulable phosphor sheet 13. The emitted light 14, which may be, for example, blue light, is collected by the lens array 15 and guided-toward the CCD line sensor 17. The emitted light 14 is photoelectrically detected by the CCD line sensor 17. The stimulating rays 10, which are reflected from the stimulable phosphor sheet 13 and travel toward the CCD line sensor 17, are filtered out by the stimulating ray cut-off filter 16.

The CCD line sensor 17 photoelectrically detects the emitted light 14 and feeds out the analog light detection signal S, which corresponds to the intensity of the emitted light 14 (i.e., which represents the radiation image having been stored on the stimulable phosphor sheet 13). The analog light detection signal S is amplified by the amplifier 20 and converted by the analog-to-digital converter 21 into the digital image signal D.

Thereafter, the digital image signal D is fed into the image processing unit 22, which performs the image processing, such as filtering processing described later, pixel density transform processing described later, and gradation processing, on the digital image signal D. The digital image signal D, which has been obtained from the image processing performed by the image processing unit 22, is fed into the image reproducing apparatus 23 and is utilized for reproducing the radiation image, which has been scored on the stimulable phosphor sheet 13, as a visible image. The image reproducing apparatus 23 may be displaying means constituted of a CRT display device, or the like. Alternatively, the image reproducing apparatus 23 may be a recording apparatus for performing light scanning recording on photosensitive film.

In the image processing unit 22, the filtering processing is performed such that, for example, transfer characteristics with respect to the spatial frequency of approximately 4 cycles/mm with respect to the main scanning direction are set to be zero. Therefore, the digital image signal D, which has been obtained from the filtering processing, becomes free from image signal components representing the stripe-like grid patterns G, G, . . . having the spatial frequency of approximately 4 cycles/mm. How the effects of the filtering processing are capable of being obtained appropriately will be described later.

Thereafter, in the image processing unit 22, the digital image signal D having been obtained from the filtering processing is subjected to the pixel density transform processing, in which the pixel density in the main scanning direction is coarsened by a factor of 4. In this manner, the digital image signal D is transformed into a digital image signal representing a radiation image in which the pixel size in the main scanning direction is equal to 100 $\mu$m. The speed, at which the stimulable phosphor sheet 13 is moved by the endless belt 18, is set previously such that the pixel size in the sub-scanning direction becomes equal to 100 $\mu$m.

The array pitch of the sensor chips 17a, 17a, . . . of the CCD line sensor 17 is equal to 25 $\mu$m (=0.025 mm). The reciprocal of the array pitch of the sensor chips 17a, 17a, . . . of the CCD line sensor 17 is equal to 40 cycles/mm. The reciprocal of the array pitch of the sensor chips 17a, 17a, . . . of the CCD line sensor 17 is thus larger than the value (8 cycles/mm) two times as large as the value of the spatial frequency (4 cycles/mm) of the stripe-like grid patterns G, G, . . . , which spatial frequency is taken with respect to the array direction of the sensor chips 17a, 17a, . . . Therefore, for the reasons described above, the digital image signal D before being subjected to the filtering processing accurately represents the stripe-like grid patterns G, G, . . . having the spatial frequency of 4 cycles/mm. Accordingly, in cases where the predetermined filtering processing is performed on the digital image signal D, the stripe-like grid patterns G, G, . . . are capable of being removed or suppressed appropriately.

The array pitch of the sensor chips 17a, 17a, . . . of the CCD line sensor 17 is not limited to 25 $\mu$m (=0.025 mm) and may be set at one of various values, which fall within the range such that the reciprocal of the array pitch of the sensor chips 17a, 17a, . . . of the CCD line sensor 17 is larger than the value two times as large as the value of the spatial frequency of the stripe-like grid patterns G, G, . . .

In the aforesaid embodiment of the radiation image read-out apparatus in accordance with the present invention, the stimulable phosphor sheet for storing the radiation image may be an ordinary stimulable phosphor sheet having both the functions for absorbing radiation and the functions for storing energy from the radiation. Alternatively, the stimulable phosphor sheet may be a stimulable phosphor sheet proposed in, for example, Japanese Patent Application No. 11(1999)-372978. With the proposed stimulable phosphor sheet, such that the functions for absorbing radiation and the functions for storing energy from the radiation may be separated from each other, the stimulable phosphor sheet is provided with a layer of a stimulable phosphor for energy storage. In cases where the stimulable phosphor sheet provided with the layer of the stimulable phosphor for energy storage is utilized, the detection quantum efficiency in the formation of the radiation image, i.e., the radiation absorptivity, the light emission efficiency, the emitted light pickup efficiency, and the like, is capable of being enhanced as a whole. Therefore, the image quality of the reproduced image is capable of being enhanced even further.

Further, the stimulable phosphor sheet employed in the aforesaid embodiment of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface.

As the stimulable phosphor sheet for energy subtraction processing, it is possible to employ an anisotropic stimulable, phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

In the aforesaid embodiment of the radiation image read-out apparatus in accordance with the present invention, the stimulable phosphor sheet 13 is moved by the endless belt 18 at the predetermined speed, and the sub-scanning with the stimulating rays 10 is thereby performed. However, the means for the sub-scanning with the stimulating rays 10 is not limited to the technique utilizing the endless belt 18. For example, rollers may be utilized for moving the stimulable phosphor sheet 13. As another alternative, the stimulable phosphor sheet 13 may be kept stationary, and the stimulating ray irradiating means and the line sensor, and the like, may be moved together with respect to the stimulable phosphor sheet 13.

What is claimed is:

1. A radiation image read-out method, comprising the steps of:

i) linearly irradiating stimulating rays onto an area of a stimulable phosphor sheet, on which a radiation image has been stored with an image recording operation utilizing a stationary grid, with stimulating ray irradiating means, the stimulating rays causing the stimulable phosphor sheet to emit light in proportion to an amount of energy stored thereon during its exposure to radiation, ii) receiving light, which is emitted by the stimulable phosphor sheet, with a line sensor comprising a plurality of photoelectric conversion devices, which are arrayed along the linear area of the stimulable phosphor sheet exposed to the linear stimulating rays, the received light being subjected to photoelectric conversion performed by the line sensor, and iii) moving the stimulable phosphor sheet with respect to the stimulating ray irradiating means and the line sensor and in a sub-scanning direction intersecting with a length direction of the linear area of the stimulable phosphor sheet exposed to the linear stimulating rays, wherein a reciprocal of an array pitch of the photoelectric conversion devices constituting the line sensor is larger than a value two times as large as a value of a spatial frequency of stripe-like grid patterns recorded on the stimulable phosphor sheet due to the stationary grid, which spatial frequency is taken with respect to an array direction of the photoelectric conversion devices, the line sensor is located in an orientation, such that the array direction of the photoelectric conversion devices coincides with an array direction of the stripe-like grid patterns, in which array direction the stripe-like grid patterns stand side by side, and filtering processing for removing the stripe-like grid patterns is performed on an image signal, which has been outputted from the line sensor.

2. A method as defined in claim 1 wherein transform processing for coarsening a pixel density is performed on a filtering-processed image signal, which has been obtained from the filtering processing.

3. A method as defined in claim 1 or 2 wherein the line sensor is a CCD line sensor.

4. A radiation image read-out apparatus, comprising:

i) stimulating ray irradiating means for linearly irradiating stimulating rays onto an area of a stimulable phosphor sheet, on which a radiation image has been stored with an image recording operation utilizing a stationary grid, the stimulating rays causing the stimulable phosphor sheet to emit light in proportion to an amount of energy stored thereon during its exposure to radiation, ii) a line sensor comprising a plurality of photoelectric conversion devices, which are arrayed along the linear area of the stimulable phosphor sheet exposed to the linear stimulating rays, and iii) sub-scanning means for moving the stimulable phosphor sheet with respect to the stimulating ray irradiating means and the line sensor and in a sub-scanning direction intersecting with a length direction of the linear area of the stimulable phosphor sheet exposed to the linear stimulating rays, wherein a reciprocal of an array pitch of the photoelectric conversion devices constituting the line sensor is larger than a value two times as large as a value of a spatial frequency of stripe-like grid patterns recorded on the stimulable phosphor sheet due to the stationary grid, which spatial frequency is taken with respect to an array direction of the photoelectric conversion devices, the line sensor is located in an orientation, such that the array direction of the photoelectric conversion devices coincides with an array direction of the stripe-like grid patterns, in which array direction the stripe-like grid patterns stand side by side, and the apparatus further comprises filtering means for performing filtering processing for removing the stripe-like grid patterns on an image signal, which has been outputted from the line sensor.

5. An apparatus as defined in claim 4 further comprising means for performing transform processing for coarsening a pixel density on a filtering-processed image signal, which has been outputted from the filtering means.

6. An apparatus as defined in claim 4 or 5 wherein the line sensor is a CCD line sensor.

* * * * *